Aug. 10, 1954 W. W. SLOANE Re. 23,859

MINING MACHINE WITH PICKING AND BREAKING MECHANISM

Original Filed July 11, 1947 7 Sheets-Sheet 1

INVENTOR.
William W. Sloane
BY
Murray A. Gleason
ATTORNEY

MINING MACHINE WITH PICKING AND BREAKING MECHANISM

Original Filed July 11, 1947 7 Sheets-Sheet 2

INVENTOR.
William W. Sloane
BY
Murray A. Gleason
ATTORNEY

MINING MACHINE WITH PICKING AND BREAKING MECHANISM
Original Filed July 11, 1947 7 Sheets-Sheet 3
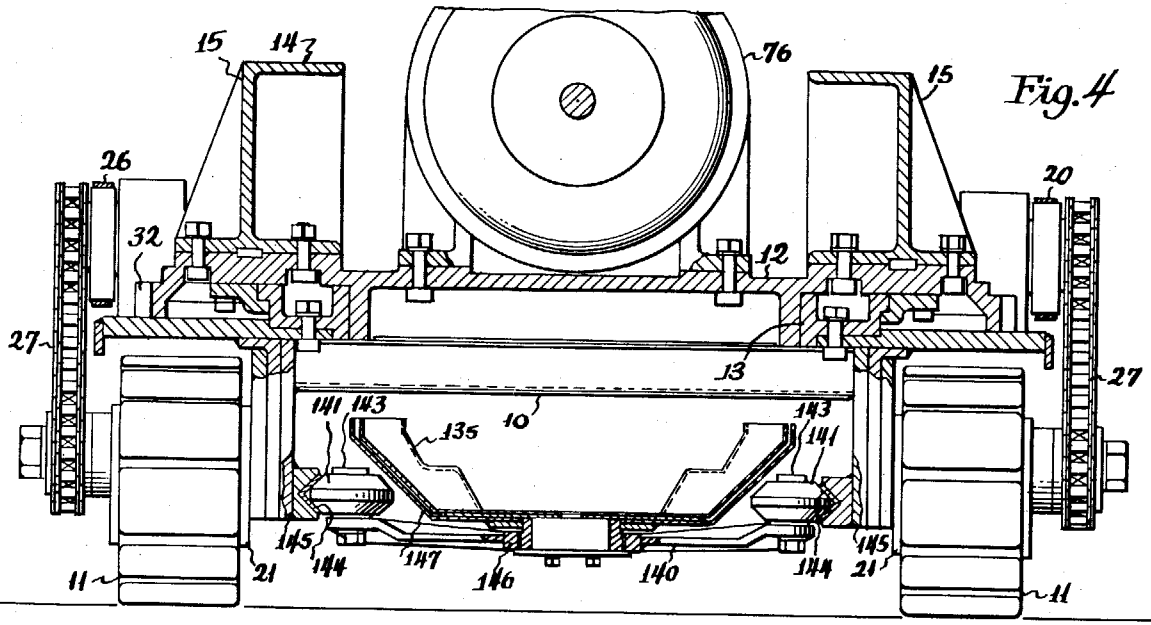
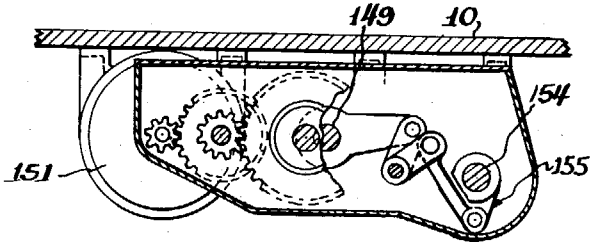
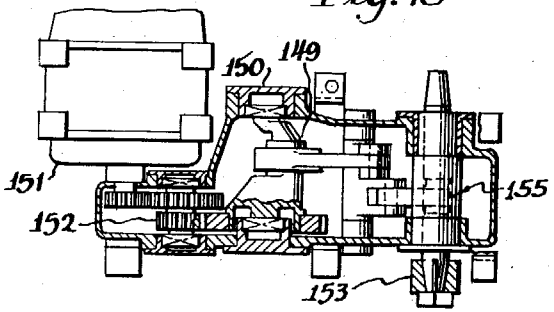
INVENTOR.
William W. Sloane
BY
Murray A. Gleason
ATTORNEY

MINING MACHINE WITH PICKING AND BREAKING MECHANISM

Original Filed July 11, 1947 7 Sheets-Sheet 4

INVENTOR.
William W. Sloane
BY
Murray A. Gleeson
ATTORNEY

MINING MACHINE WITH PICKING AND BREAKING MECHANISM

Original Filed July 11, 1947 7 Sheets-Sheet 5

INVENTOR.
William W. Sloane
BY
Murray P. Gleason
ATTORNEY

MINING MACHINE WITH PICKING AND BREAKING MECHANISM

Original Filed July 11, 1947 7 Sheets-Sheet 6

INVENTOR.
William W. Sloane
BY
Murray A. Gleeson
ATTORNEY

MINING MACHINE WITH PICKING AND BREAKING MECHANISM
Original Filed July 11, 1947 7 Sheets-Sheet 7
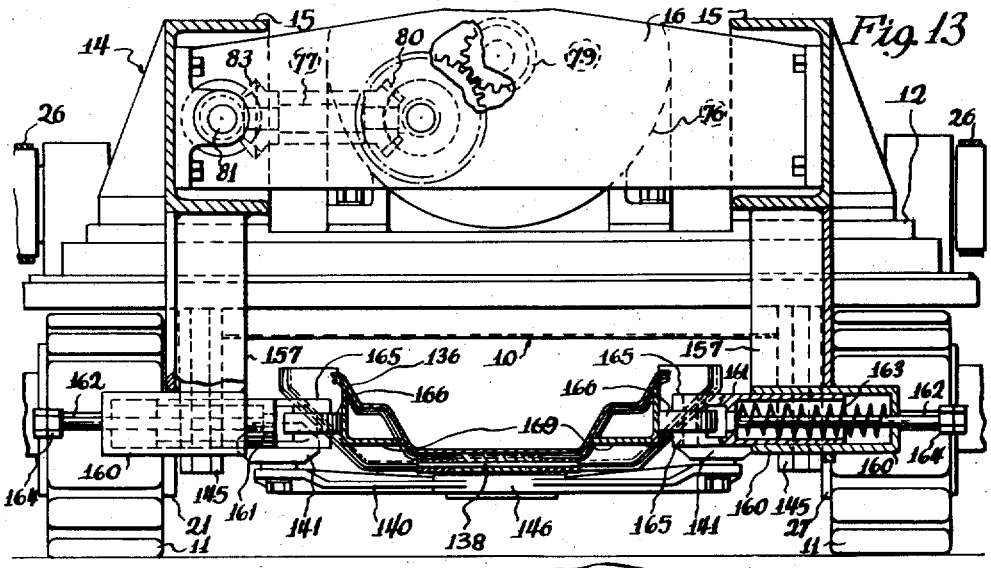
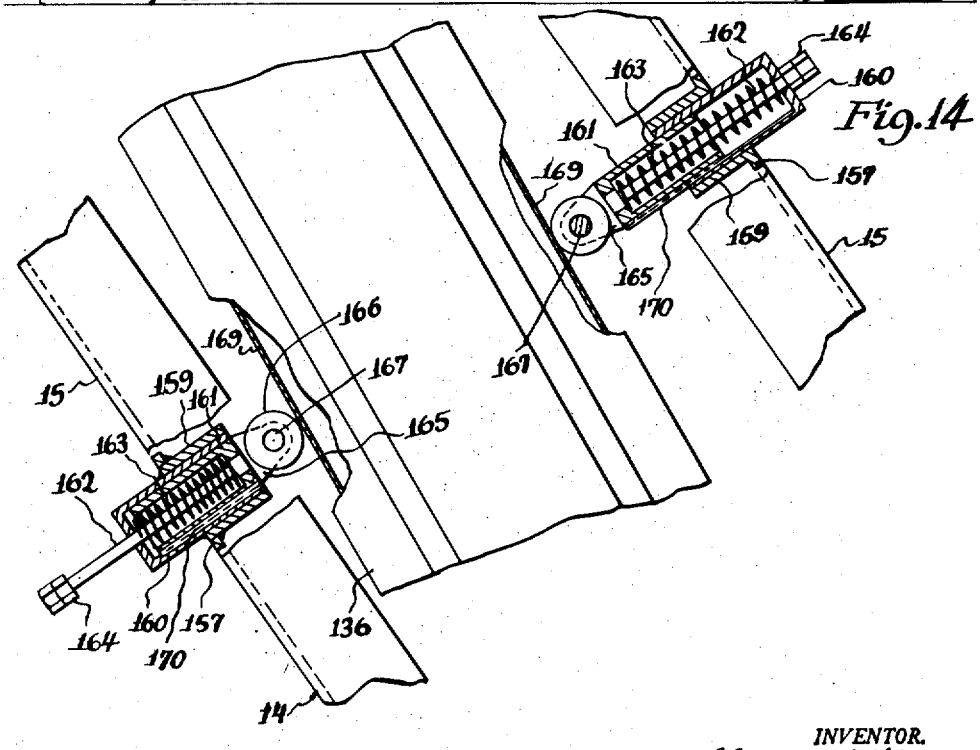
INVENTOR.
William W. Sloane
BY
Murray A. Gleason
ATTORNEY Reissued Aug. 10, 1954 Re. 23,859

UNITED STATES PATENT OFFICE 23,859

MINING MACHINE WITH PICKING AND BREAKING MECHANISM

William W. Sloane, Chicago, Ill., assignor to Goodman Manufacturing Company, Chicago, Ill., a corporation of Illinois Original No. 2,597,040, dated May 20, 1952, Serial No. 760,377, July 11, 1947. Application for reissue September 20, 1952, Serial No. 310,741

20 Claims. (Cl. 262—16)

Matter enclosed in heavy brackets [ ] appears in the original patent but forms no part of this reissue specification; matter printed in italics indicates the additions made by reissue.

This invention relates to improvements in mining machines especially adapted for use in mining coal, and more particularly relates to a mining machine of the combined mining and loading type wherein one machine can dislodge the coal from a solid working place of a mine and at the same time gather and load it out.

The principal objects of my invention are to provide a novel, improved and efficient form of picking mechanism for picking and breaking down the coal from the solid face of a mine from the floor to the roof, in a simple, expeditious and efficient manner without the use of powder, together with gathering and conveying mechanism cooperating with said picking and breaking mechanism for gathering the broken down coal and conveying it beyond the rear of the machine, for discharge into a room conveyor or other suitable material carrying receptacle.

A further object of my invention is to provide a novel and improved form of oscillating picking mechanism including two oscillating picking devices and a novel form of elastic drive means therefor, for driving said devices from a single crank and providing independent elastic and yieldable drive connections from said crank to the picking devices, adding to the force of the blow of said picking devices and yielding when either device engages an obstruction through which it cannot cut.

These and other objects will appear from time to time as the following specification proceeds and with reference to the accompanying drawings, wherein:

Figure 4 is a transverse sectional view taken substantially along line 4—4 of Figure 2;

Figure 6 is an enlarged fragmentary plan view of the forward part of the machine shown in Figure 1, with certain parts broken away and certain other parts shown in horizontal section in order to show certain details of the drive to the picking mechanism;

Figure 12 is an enlarged detail plan view of a portion of the picking element, with certain parts broken away and certain other parts shown in substantially horizontal section in order to illustrate certain details of the drive to one of the picking devices;

Figure 13 is an enlarged fragmentary transverse sectional view taken substantially along line 13—13 of Figure 2;

Figure 14 is an enlarged detail fragmentary plan view with certain parts broken away and certain other parts in horizontal section, and showing certain details of the means for feeding the loading pan laterally with the picking element;

Figure 15 is an enlarged detail fragmentary plan view with certain parts broken away and certain other parts shown in horizontal section on order to show certain details of the drive mechanism for the conveyor; and Figure 16 is a detail view in side elevation of the drive mechanism for the conveyor shown in Figure 15, with certain parts shown in substantially longitudinal section.

Figure 1:
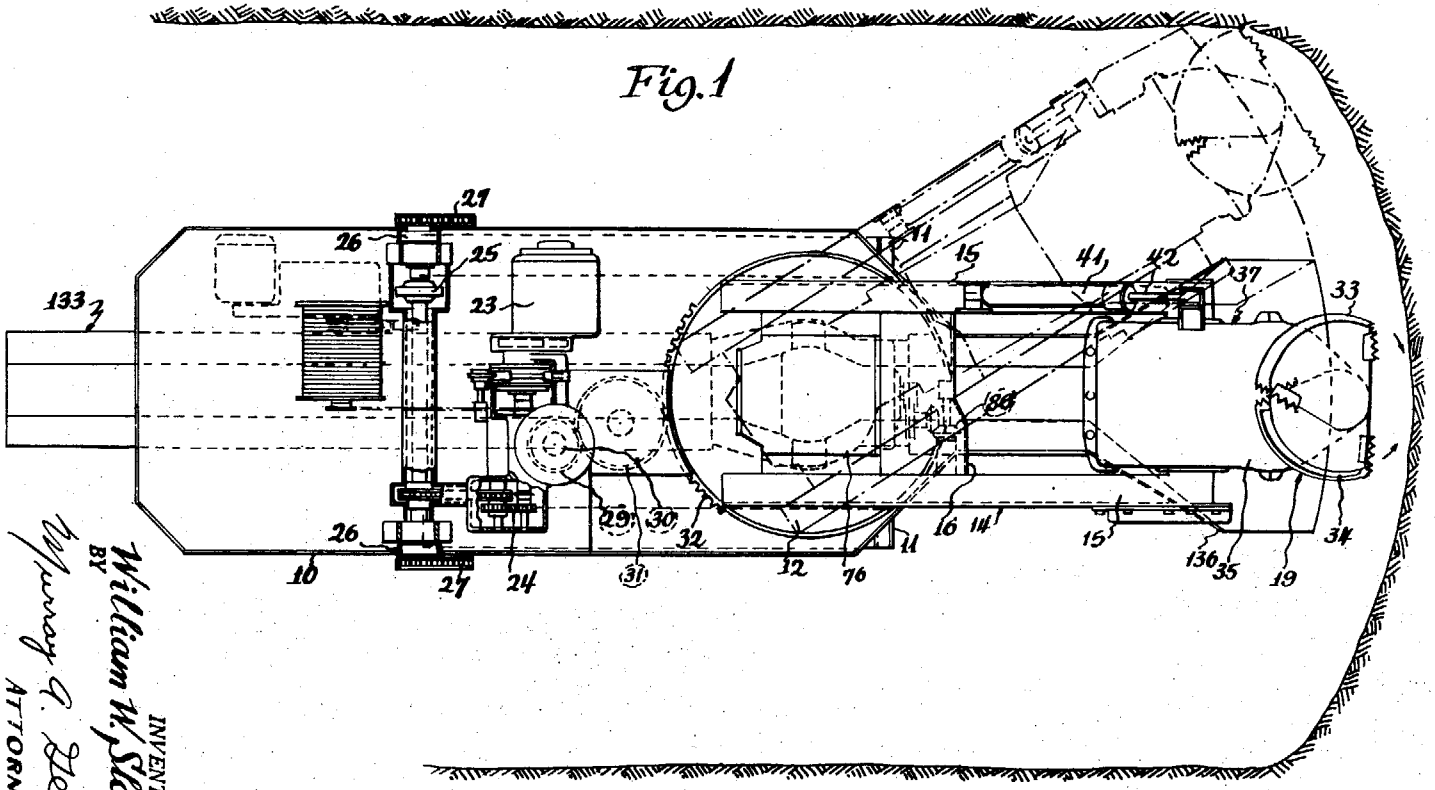
Figure 1 is a view showing in plan a machine constructed in accordance with my invention.

Referring now to the details of my invention illustrated in the drawings, a main frame 10 forms a base for the machine and is mounted on a pair of laterally spaced ground supported continuous traction tread devices 11, 11. A turntable 12 is mounted at the forward end of said main frame in a bearing 13 and has a supporting arm 14 mounted on and extending forwardly therefrom. Said arm is herein shown as including two facing laterally spaced frame members 15, 15, of a substantially channel-shaped formation, secured to said turntable at their rear ends and extending a substantial distance beyond the forward end of said main frame and connected together by an intermediate brace 16. Said arms each have a bearing support 17 at their forward ends forming a trunnion mounting for a picking element 19 disposed therebetween and extending forwardly therefrom and mounting said picking element for vertical adjustment about a transverse axis, to pick and break down the coal from the mine roof to the mine floor. While said arm 14 is herein shown as being secured to said turntable, it is readily understandable that it may be transversely pivoted to said turntable where it is desired to afford a greater degree of vertical adjustment of said picking element than is shown herein.

The continuous traction tread devices are mounted in tread supporting and guide frames 21, 21 secured to and depending from the bottom of the main frame 10. Longitudinally spaced rollers 22, 22 are journaled adjacent the lower ends of said frames and form anti-friction supports for the lower runs of said tread devices. A motor 23 is provided to drive said tread devices independently or simultaneously of each other, to propel the machine and turn it in the desired directions. The drive connection from said motor to said tread devices includes a suitable gear train indicated generally by reference character 24 and having a differential 25, braking devices 26, 26 for holding either tread device from movement, and chain and sprocket drives 27, 27 for connecting said differential with said tread devices (see Figures 1 and 4). Said gear train, differential, and braking devices are not herein shown or described in detail since they may be of any well known form, and form no part of my invention.

Figure 3:
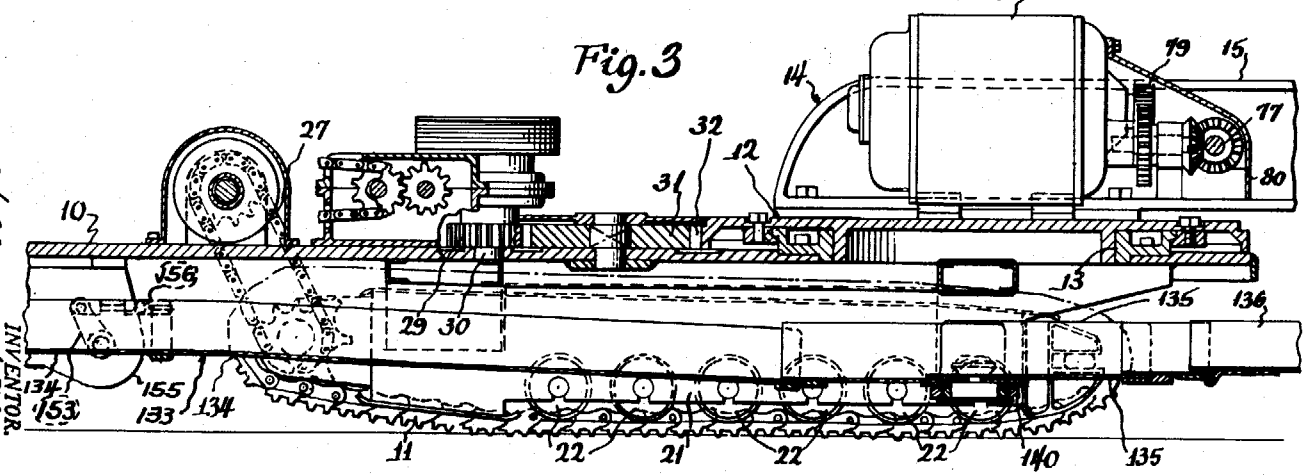
Figure 3 is a partial fragmentary enlarged longitudinal sectional view taken through the main frame of the machine shown in Figure 1.

The motor 23 also turns the turntable 12 by power to feed the picking element 19 across the coal face through a suitable gear train including a pinion 29 on a vertical shaft 30, an idler gear 31 driven thereby and meshing with gear teeth 32 cut on the face of said turntable (see Figure 3). Said gear train likewise may be of a well known form and is not herein shown or described in detail, since it forms no part of my present invention.

The picking element 19 includes two vertically spaced oscillating segmental picking devices 33 and 34 adapted to engage the coal with penetrating blows during their forward and return strokes and herein shown as being journaled in an upper frame 35 and a lower frame 36 respectively, of a housing 37. Said housing also forms a housing and bearing support for the drive mechanism for oscillatably driving said picking devices. Said picking devices are pivotally mounted in said frames to oscillate in opposite directions about axes disposed at oblique angles with respect to each other, and are so positioned as to simultaneously engage the solid coal face during their forward and return strokes at penetrating angles, and at laterally and vertically spaced points.

The lower frame 36 of the housing 37 has two bearing bosses 39 and 40 projecting laterally from its opposite sides and intermediate its ends. Said bearing bosses are journaled in the bearing supports 17, 17 on the forward ends of the frame members 15, 15 (see Figures 6 and 9).

Figure 5:
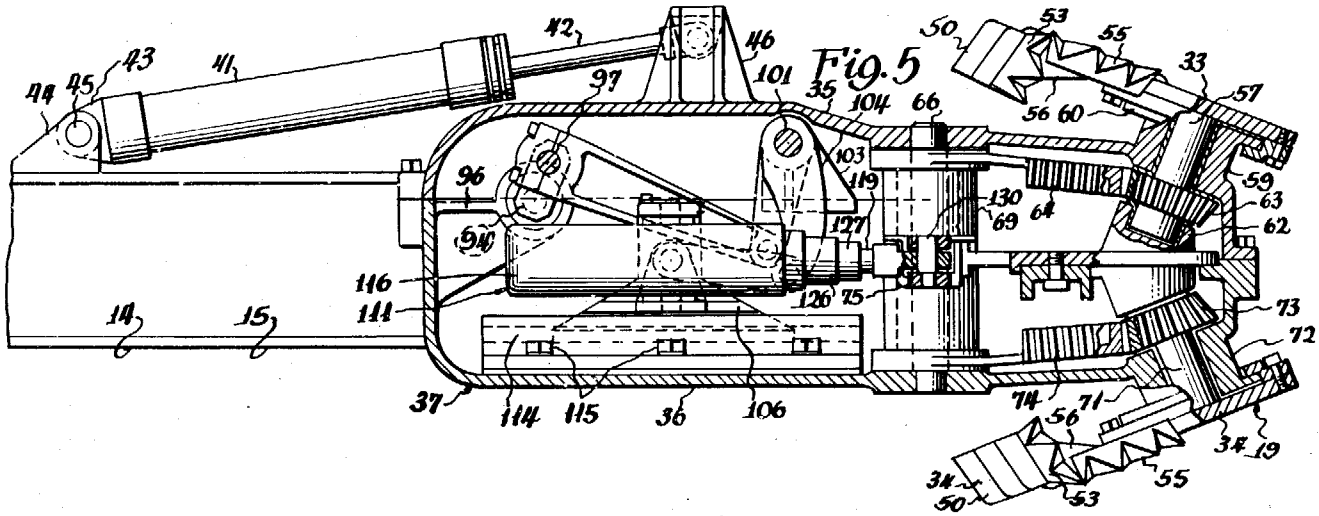
Figure 5 is a partial fragmentary enlarged longitudinal sectional view taken through the picking element and forming a forward continuation of Figure 3, but drawn to a larger scale than Figure 3.

The picking element 19 is pivotally moved about the axes of the bearing bosses 39 and 40 and is held in fixed relation wtih respect to the arm 14 by means of a fluid pressure cylinder 41 having a piston rod 42 extensible therefrom. Said cylinder has an ear 43 extending from its head end between two upright lugs 44, 44 extending upwardly from the frame member 15 of the arm 14 and pivotally connected thereto on a transverse pivotal pin 45 (see Figure 5). The free end of said piston rod is in the form of an eye and extends between opposite sides of an upright bracket 46, projecting upwardly from the upper frame 35, intermediate its ends. A pivotal pin 47 pivotally connects said eye to said bracket. Said cylinder may be a double acting cylinder and fluid under pressure may be supplied to its piston rod end and released from its head end, to elevate the picking element 19, through a suitable fluid pressure system (not shown). Pressure may be held in both ends of said cylinder, to hold said picking element in the desired position of vertical adjustment, and may be released from the piston rod end of said cylinder and supplied to the head end of said cylinder, under control of the operator, to positively lower said picking element.

The picking devices 33 and 34 are of a similar construction so a description of one will suffice for both. The picking device 33, as herein shown, is in the form of a sector of a circle having an inwardly extending angular flange 50 which also extends angularly outwardly from the center of turning movement of said sector, as may clearly be seen with reference to Figure 5. Picking or cutting teeth 51 positioned for engagement with the face of the coal at an angle which will cause said teeth to penetrate and break off the coal from a solid coal face upon the forward strokes of said picking device, are herein shown as being detachably secured to the forward edge of said flange by means of a machine screw 52. Picking or cutting teeth 53, 53 positioned to penetrate and break off the coal from a solid coal face upon the return strokes of said picking device, are shown as being detachably secured to the rearward edge of said flange by means of a machine screw 54. Picking or cutting teeth 55, 55 are likewise detachably mounted in opposite edges of the web of said sector for picking down overhanging coal and for picking adjacent the roof. Said picking device is weighted with lead or any other suitable material as indicated by reference character 56, to add to the inertia of said picking device and make it heavy enough to give a substantial blow when the teeth 51 or 53 strike the coal face.

The picking device 34 is also weighted and picking teeth similar to those on the picking device 33 are provided in opposite ends of the flanged portion of the picking device 34, for picking and breaking off coal from the solid coal face during its forward and return strokes. Picking teeth are also provided in opposite ends of the web of the sector, for picking adjacent the mine floor. Since the teeth in each picking device are the same, they will be designated by the same part numbers for both picking devices.

Figure 8:
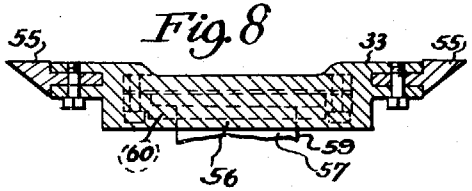
Figure 8 is a sectional view taken substantially along line 8—8 of Figure 6.
Figure 7:
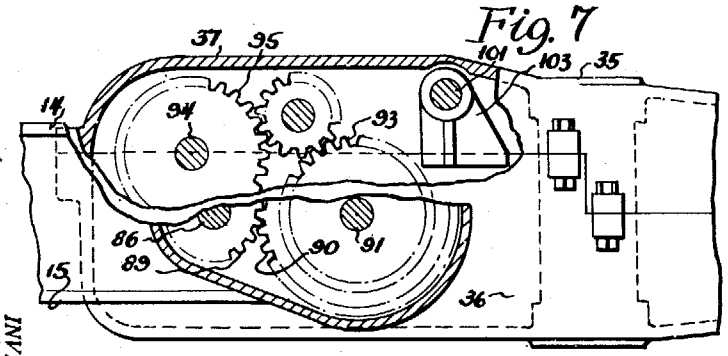
Figure 7 is a detail fragmentary view in side elevation of a portion of the picking element, drawn to substantially the same scale as Figure 4, with certain parts broken away and certain other parts shown in substantially longitudinal section in order to illustrate certain details of the drive to the picking devices.
Figure 8:
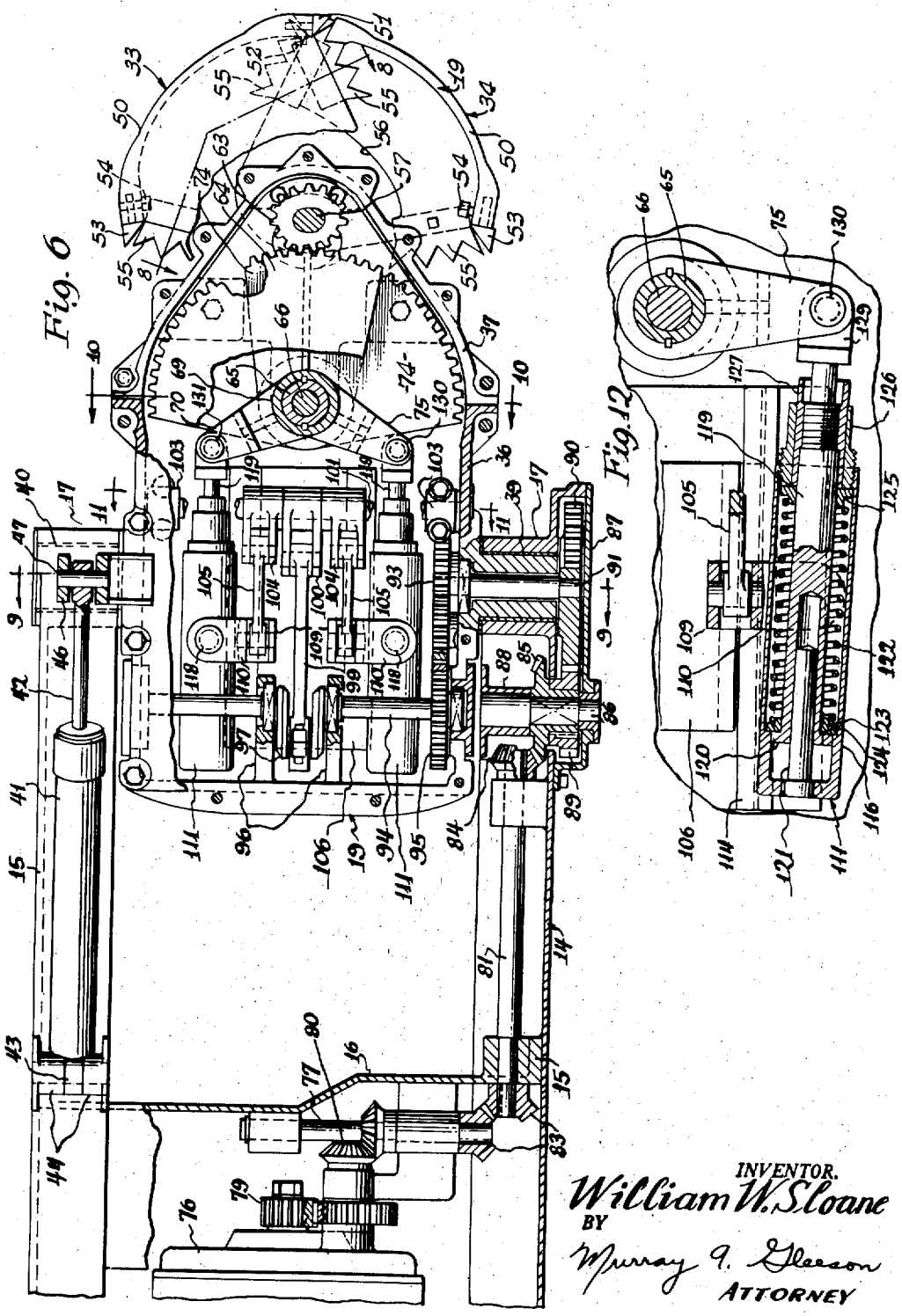
Figure 10:
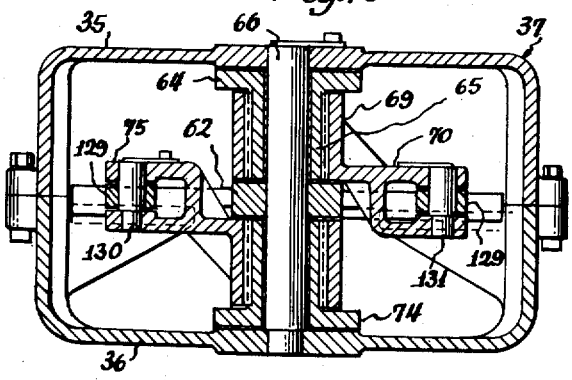
Figure 10 is an enlarged fragmentary transverse sectional view taken substantially along line 10—10 of Figure 6.

The picking device 33 has an integrally formed shaft 57 extending inwardly therefrom which is journaled in a flanged boss 59 projecting angularly outwardly from the forward end of the upper frame 35 at an obtuse angle with respect to the longitudinal center line of the housing 37. A gibbed retaining ring 60 is secured to the underside of the web of said picking device and encircles and extends over the flange of said flanged boss, for retaining said picking device to said boss (see Figures 5 and 8). The inner end of the shaft 57 is journaled in a bearing support member 62 detachably secured to the lower frame 36 of said housing. A bevel pinion 63 secured to said shaft between the inside of said upper frame and the bearing support member 62, serves to reciprocably drive said shaft and said picking device. Said bevel pinion meshes with a bevel gear sector 64. Said bevel gear sector is provided with an enlarged hub 65 which is journaled on the upper half of a vertical shaft 66 (see Figure 10). Said shaft is mounted at its ends in the top and bottom sides of the frames 35 and 36, and is mounted intermediate its ends in the bearing support member 62.

The hub 65 of the bevel gear sector 64 is encircled by a hub 69 of a rocking arm 70, which is keyed thereto, for rocking said gear sector and oscillatably moving the upper picking device 33. Said rocking arm is rocked to oscillate its associated picking device to strike the coal face with penetrating blows during its forward and return strokes, as will hereinafter more clearly appear as this specification proceeds.

In a like manner, the lower picking device 34 has a shaft 71 formed integrally therewith which is journaled in a flanged boss 72 extending angularly downwardly from the forward lower wall portion of the frame or casing 36, at an obtuse angle with respect to the longitudinal center line of the housing 37. The angle of inclination of said shaft with respect to the longitudinal center line of said housing is herein shown as being the same as the angle of inclination of the shaft 57 with respect to said longitudinal center line, except that said shafts extend in opposite directions with respect to each other. A bevel pinion 73, keyed on said shaft, meshes with and is driven from a bevel gear sector 74 journaled on the lower portion of the vertical shaft 66. A rocking arm 75, like the rocking arm 70 but extending in an opposite direction from said rocking arm, is keyed on the hub of said gear sector 74 for reciprocably moving said gear sector in a direction opposite to the direction of movement of the gear sector 64, and oscillatably driving the lower picking device 34 in directions opposite to the directions of movement of said upper picking device 33.

A motor 76 mounted on the turntable 12 between the frame members 15, 15 of the arm 14 is provided to oscillatably drive the picking devices 33 and 34 in opposite directions through separate elastic drive connections. Said motor drives a transverse shaft 77 journaled in the cross brace 16, through spur reduction gearing 79 and a pair of meshing bevel gears 80, 80 (see Figure 6). Said transverse shaft has drive connection with a longitudinal shaft 81 journaled in and extending along the right-hand frame member 15, between the webs thereof, through a pair of meshing bevel gears 83, 83. A bevel pinion 84 on the forward end of said shaft meshes with and drives a bevel gear 85 journaled on a transverse shaft 86 mounted at its outer end in a gear casing 87 and at its inner end in a support member 88, secured to and extending upwardly from the lower flange of said frame member 15. A spur pinion 89 keyed on the hub of said bevel gear meshes with and drives a spur gear 90 keyed on a transverse shaft 91. Said transverse shaft is journaled in the bearing boss 39 coaxial with the axis of vertical adjustment of the picking element 19, and extends within the housing 37. A spur gear 93 is keyed on the inner end of said shaft and drives a parallel rearwardly disposed crank shaft 94 through a spur gear train indicated generally by reference character 95.

Figure 11:
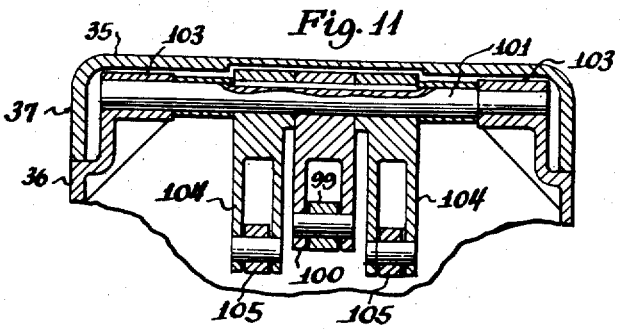
Figure 11 is an enlarged partial fragmentary transverse sectional view taken substantially along line 11—11 of Figure 6.

The crank shaft 94 is journaled at its opposite ends in opposite side walls of the housing 37, and is journaled intermediate its ends in spaced bearing brackets 96, 96 extending inwardly from the rear wall of the lower frame 36. A crank 97 formed intermediate the ends of said shaft between the bearing brackets 96, 96 has a connecting rod 99 journaled thereon. The opposite end of said connecting rod is journaled on the lower end of a rocking arm 100 keyed on a transverse shaft 101 journaled at its opposite ends in bearing brackets 103, 103 extending upwardly and inwardly of opposite side walls of the lower frame 36, to a position adjacent the top of the upper frame 35 (see Figure 11). Two rocking arms 104, 104 are keyed on said transverse shaft, on opposite sides of the rocking arm 100. Each of said rocking arms has a connecting rod 105 pivotally connected thereto. The opposite ends of said connecting rods are pivotally connected to a slide 106 by means of pivotal pins 107, 107. Said pivotal pins are mounted at one of their ends in ears 109, 109 extending upwardly from said slide and at their opposite ends in the inner sides of channel shaped brackets 110, 110 spaced outwardly from said ears and forming pivotal supports for yieldable links 111, 111 which form independent elastic drive members for the two picking devices (see Figures 6 and 9).

Figure 9:
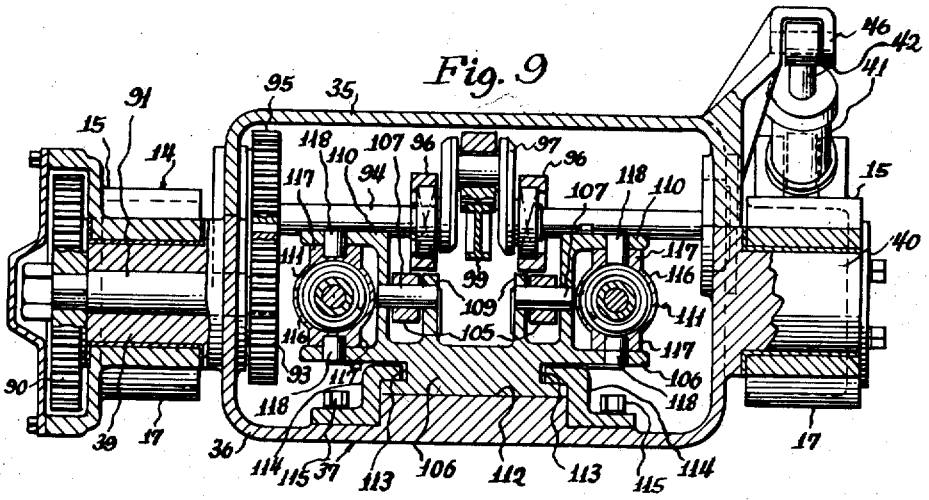
Figure 9 is an enlarged transverse sectional view taken substantially along line 9—9 of Figure 6.

The slide 106 is slidably mounted on a flat raised portion 112 of the bottom of the frame 36 for reciprocating movement with respect thereto (see Figure 9). Said slide is provided with grooves or channeled guides 113, 113 extending along its opposite sides. Each of said guides is adapted to be engaged by the gib of a gibbed retaining member 114, secured to the bottom of the lower frame 36 as by cap screws 115, 115. Said retaining member extends along opposite sides of the flat raised bottom portion 112 and forms a guide and retaining means for said slide as it is reciprocably moved by the connecting rods 105, 105.

Each yieldable link 111 consists of a cylinder 116 having opposite extending bosses 117, 117 intermediate its ends. Said bosses are pivotally mounted in opposite flanges of the channel-shaped bracket 110 on pivotal pins 118, 118 (see Figure 9). A plunger 119 having a flanged inner end 120 is slidably guided within said cylinder on its flange, engaging an inside portion of said cylinder of a reduced diameter (see Figure 12). Said plunger is also guided on a guide pin 121 extending within said cylinder from its head end. Said plunger is encircled by a compression spring 122 one end of which abuts and is seated on a flanged collar 123, which abuts the flange 120 of said plunger and which also abuts a shouldered portion 124 of said cylinder, when said piston is in a retracted position. The opposite end of said spring abuts and is seated on a flanged collar 125. Movement of said collar towards the open end of said cylinder is limited by a sleeve 126 threaded within said open end. Said spring may be preloaded by *adjusting said sleeve 126 and* an elongated adjusting nut 127 threaded on said plunger and slidably movable within said sleeve 126. Said spring forms an elastic drive member for its associated picking device which may be preloaded sufficiently to prevent excessive vibration or spring oscillation and to add to the force of the blows imparted by its associated picking device.

The outer end of the plunger 119 has an eye 129 formed integrally therewith. Said eye on the plunger for the link 111 which is the right-hand link 111, when looking towards the forward end of the machine, extends between the furcations of the rocking arm 75, and is pivotally connected thereto by a pivotal pin 130. The eye 129 on the left-hand plunger 119 extends between the furcations of the rocking arm 70, and is pivotally connected thereto by a pivotal pin 131.

Rotation of the crank 97 will thus move the picking devices 33 and 34 in opposite directions to engage the face of the coal during their forward and return strokes. Moreover, the yieldable links 111, 111 in the drive to each picking device besides adding to the force of the blows imparted by said picking devices, may yield upon the forward and return strokes of said picking device when either picking device engages hard spots or obstructions in the coal face, such as sulphur balls, rock, or sulphur streaks, to minimize the possibility of breaking said picking devices and the driving parts therefor.

The conveying means for loading out the coal picked and broken down by the picking devices 33 and 34 is of a compact low overall height arranged to efficiently convey the coal broken down along the main frame 10 beneath the turntable 12, and is herein shown as being a conveyor 133 of the shaker or jigging type. Said conveyor requires less vertical height than a chain or belt conveyor, and thus makes it possible to convey the coal beneath the top of said main frame without increasing the height of the machine to the extent that would be necessary with a chain or belt conveyor. Said shaker conveyor includes a trough 134 extending between the tread devices 11, 11. A laterally movable swivel trough 135 extends from the forward end of said trough 134. A loading pan 136 is transversely pivoted to said swivel trough on a hinge member 138 and extends forwardly of said main frame and slidably engages the ground at its forward end in material receiving relation with respect to the picking devices 33 and 34.

The trough 134 is supported adjacent its rear end on rollers 137, 137, which ride on the top surface of the bottom of a substantially U-shaped support frame 139, suitably secured at its upper ends to the underside of the main frame 10. Said trough is supported at its forward end on a transverse bracket 140 reciprocably supported on rollers 141, 141 (see Figures 4 and 13). Said rollers are mounted on opposite ends of said bracket on vertical shafts 143, 143 and have V-shaped engaging faces engaging and supported in recessed guides 144, 144 extending along the insides of depending frames 145, 145, having the tread supporting frames 21, 21 secured to the outer sides thereof.

The transverse bracket 140 has an annular bearing boss 146 at its center which forms bearing support for the swivel trough 135, mounting said swivel trough for movement about a vertical axis with respect to a trough 147, within which said swivel trough is nested. Said trough 147 is suitably secured to the receiving end of the trough 134 and extends forwardly therefrom and has an outwardly flared forward end portion corresponding to the form of the rear end of the swivel trough 135, to guide the material to continuously flow along said troughs, when the loading pan and swivel trough are displaced laterally about the axis of the bearing boss 146.

Figure 2:
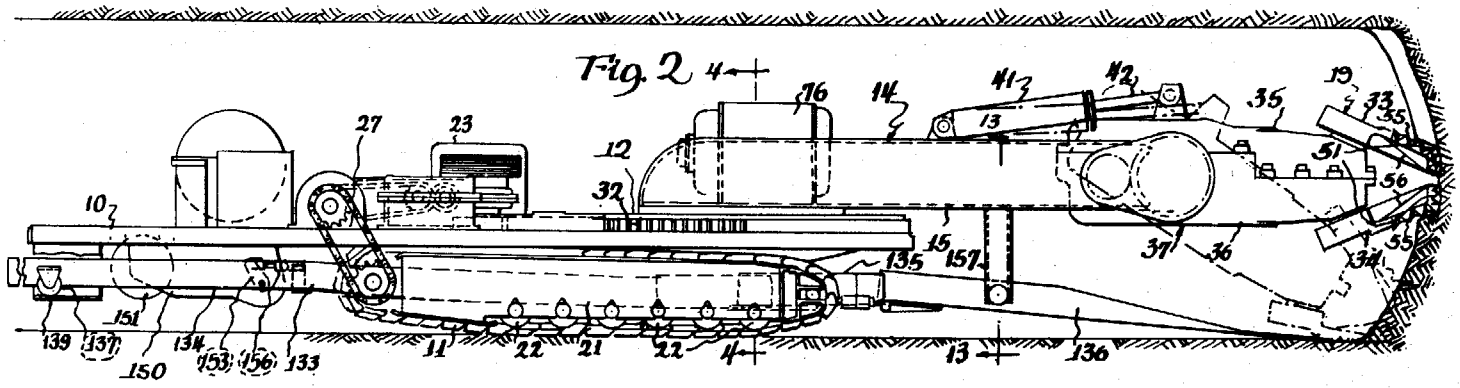
Figure 2 is a side view of the machine shown in Figure 1, drawn to a slightly larger scale than Figure 1.

The mechanism for reciprocably driving the conveyor may be of any well known form and is herein shown as being of a form similar to that disclosed in my Patent No. 2,029,133 which issued January 28, 1936, and includes a crank 149 journaled in a casing 150 secured to and depending from the bottom of the main frame 10 (see Figures 2, 15 and 16). A motor 151 secured to the bottom of said main frame, is provided to drive said crank through a gear train indicated generally by reference character 152. A rocking arm 153 on the outer end of a transverse shaft 154, journaled in said casing, is rocked by said crank through a rocking and linkage mechanism 155 in such a manner as to cause the flow of material along the trough 134 towards the rear end of the machine, when said trough is operatively connected with said rocking arm 153. A connecting link 156 operatively connects said rocking arm with the trough 134, for reciprocably driving said trough and the loading pan 136 (see Figure 2).

The loading pan 136 has at widened relatively flat forward or receiving end for collecting the material cut and broken down by the picking devices 33 and 34 and for picking up the broken down material from the ground. Two arms 157, 157 depending from opposite frame members 15, 15, are provided to move said loading pan laterally along the ground about the axis of the swivel trough 135, to follow said picking devices as they cut laterally across a working face of a mine (see Figures 2, 13 and 14). Each of said arms has an inwardly extending sleeve 159 secured to its lower end. Said sleeve forms a support for a cylinder 160 mounted therein and extending outwardly therefrom. Said cylinder is closed at one of its ends and its open end faces the loading pan 136 and has a cylinder 161 slidably mounted therein. The outer end of said last mentioned cylinder 161 is closed. A rod 162 is secured to said closed end of said cylinder 161 and slidably extends through the closed or head end of the cylinder 160. A spring 163 encircles said rod and abuts the insides of the closed ends of said cylinders at its opposite ends, and acts to hold said cylinders in extended relation with respect to each other. Lock nuts 164, 164 on the end of said rod limit extension of said cylinder 161. Two spaced ears 165, 165 extend inwardly from said cylinder 161 towards the loading pan 136 and have a roller 166 mounted therebetween on a vertical pin 167. Said roller is adapted to engage a bearing plate formed from the vertical leg of an angle 169, which extends along and is secured to the outside of said loading pan at the ends of its legs. A feather key 170 is provided to hold said cylinder 161 from turning about its axis and to hold the roller 166 in a horizontal position. The spring 163 may be of such strength that it will hold said cylinders in extended relation with respect to each other during normal lateral travel of said loading pan and will only yield when said loading pan engages an obstruction.

The rollers 166, 166 may thus move the loading pan 136 laterally about the vertical axis of the swivel trough 135, during reciprocation of the conveyor and upon lateral movement of the picking element 19, and when said loading pan comes into engagement with either rib of the working place, either spring 163 may yield, depending upon the direction of movement of said loading pan, to permit continued lateral movement of said picking element until the cylinder 161 comes into engagement with the closed end of the cylinder 160. It should here be understood that the lengths of said cylinders and springs may be varied to increase the travel of the picking element after the loading pan has come into engagement with the solid wall, if desired.

In operating the machine, the picking element 19 and picking devices 33 and 34 may be positioned adjacent the ground along one rib of the working place, by operation of the turntable 12 and by admitting fluid to the head end of the cylinder 41 and releasing it from the piston rod end of said cylinder. The motor 76 may then be started to oscillate said picking devices and the tread devices 11, 11 may advance said picking devices into the coal, to cause said picking devices to attack and penetrate the solid working face in opposite directions at laterally spaced points adjacent the ground during their forward and return strokes. At the same time the shaker conveyor 133 may be started to cause the loading pan 136 to pick up and load the coal cut and broken down by said picking devices.

The shaker conveyor 133 may be continuously operated during the entire picking and breaking down operation, and the loading pan 136 may be advanced into the broken down coal by operation of the tread devices 11, 11 as said tread devices advance the picking devices 33 and 34 into the coal.

When the picking devices 33 and 34 have advanced into the coal to the required depth, they may then be fed across the coal face by means of the turntable 12, while continuously operating, either uniformly or intermittently, depending upon cutting conditions, until they have picked or cut and broken down the coal in the vicinity of said picking devices entirely across the face. During the operation of picking across the face, the depending arms 157, 157 and rollers 166, 166 engaging opposite sides of the loading pan 136, may move said loading pan with said picking devices about the axis of the swivel trough 135, to maintain said loading pan in position to continuously gather and load the coal picked and broken down by said picking devices.

At the completion of the first picking operation across the coal face, the picking element may be elevated by supplying fluid under pressure to the piston rod end of the cylinder 41 and releasing it from the head end of said cylinder, and may be held in the desired position by holding pressure in both ends of said cylinder, while the picking devices 33 and 34 are continuously operating, and then may be fed across the coal face either continuously or intermittently in a direction opposite to the direction of the first cut, and at an elevation which may be just above the coal picked and broken down during the first picking and breaking down operation. At the end of the second picking and breaking down operation, said picking element may again be raised and its direction of transverse travel across the coal face may again be reversed, to again cut across the working face and break down the coal in the vicinity of said picking element. These operations may be repeated until the coal has been picked and broken down from the entire face from the floor to the roof of the mine. The picking element may then be lowered to a position adjacent the ground and along one rib of the working place to repeat the picking, breaking down and loading operation just described, and continuously break down and load from the solid working face without shooting or interruption in the operating cycle.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a coal mining and loading machine, a self-propelled main frame, and a coal picking element mounted in advance of said main frame for horizontal adjustment with respect thereto about a vertical axis disposed within the limits of said main frame, and for vertical adjustment with respect thereto *about* a transverse axis for picking and breaking down coal from a solid mine wall without shooting, said picking element including two oppositely moving oscillating picking devices, one of which is disposed above the other and journaled for oscillating movement about upright axes disposed at obtuse angles with respect to each other and positioning said picking devices to engage the coal at penetrating angles, a motor mounted on said main frame, and crank mechanism driven by said motor for oscillatably moving said picking devices and including a separate elastic yieldable drive link operatively connected with each of said picking devices and adapted to increase the force of the blows imparted by said picking devices and to independently yield upon predetermined picking loads on said picking devices.

2. In a coal mining and loading machine, a self-propelled main frame having a turntable thereon, an overhanging arm mounted on said turntable and extending forwardly of the forward end of said main frame, a picking element transversely pivoted on said arm for vertical movement from the mine floor to the roof and projecting forwardly therefrom for picking and breaking down the coal from a solid mine wall in a continuous operation, said picking element including two oppositely moving oscillating picking devices, one of which is disposed above the other, means for oscillatably driving said picking devices including a separate elastic yieldable member driving each picking device and adapted to increase the force of the blows imparted by said picking devices and to independently yield upon predetermined picking loads thereon, and a shaker conveyor mounted on and extending along said main frame and having a loading pan resting on the ground in advance of said main frame beneath said picking devices and reciprocably movable along the ground for picking up the material picked and broken down by said picking devices and transporting it beyond the rear end of said main frame.

3. In a coal mining and loading machine, a self-propelled main frame having a turntable thereon, an overhanging arm mounted on said turntable and extending forwardly of the forward end of said main frame, a picking element transversely pivoted on said arm for vertical movement from the mine floor to the roof and projecting forwardly therefrom for picking and breaking down the coal from a solid mine wall in a continuous operation, said picking element including two oppositely moving oscillating picking devices, one of which is disposed above the other, means for oscillatably driving said picking devices including a separate elastic yieldable member driving each picking device and adapted to increase the force of the blows imparted by said picking devices and to independently yield upon predetermined picking loads thereon, and means for loading the material picked and broken down by said picking devices including a shaker conveyor mounted on and extending beneath said main frame beyond the rear end thereof and including a reciprocably driven pan extending along said main frame and a loading pan extending in advance of said main frame and resting on the ground at its forward end, for picking up the material picked and broken down by said picking devices, a swivel trough connecting said loading pan to said reciprocably driven pan to permit said loading pan to move laterally with said picking devices, and an operative connection between said arm and said loading pan, for moving said pan laterally with said arm.

4. In a coal mining and loading machine, a self-propelled main frame having a turntable thereon, an overhanging arm mounted on said turntable and extending forwardly of the forward end of said main frame, a picking element transversely pivoted on said arm for vertical movement from the mine floor to the roof and projecting forwardly therefrom for picking and breaking down the coal from a solid mine wall in a continuous operation, said picking element including two oppositely moving oscillating picking devices, one of which is disposed above the other, means for oscillatably driving said picking devices including a separate elastic yieldable member driving each picking device and adapted to increase the force of the blows imparted by said picking devices and to independently yield upon predetermined picking loads thereon, means for loading the material cut and broken down by said picking devices including a shaker conveyor mounted on and extending beneath said main frame beyond the rear end thereof and including a reciprocably driven pan extending along said main frame beneath the top thereof, a swivel pan at the receiving end thereof and movable about a vertical axis, and a loading pan extending from said swivel pan in advance of said main frame and resting on and reciprocably movable along the ground to gather the material picked and broken down by said picking devices, said loading pan being movable laterally with said picking devices about said swivel, and an operative connection between said arm and said loading pan for moving said pan laterally upon lateral movement of said arm, said connection being yieldable, to permit continued lateral movement of said arm after said loading pan has engaged a rib of the working place.

5. In a coal mining and loading machine, a self-propelled main frame having a turntable thereon, an overhanging arm mounted on said turntable and extending forwardly of the forward end of said main frame, a picking element transversely pivoted on said arm for vertical movement from the mine floor to the roof and projecting forwardly therefrom for picking and breaking down the coal from a solid mine wall in a continuous operation, said picking element including two oppositely moving oscillating picking devices, one of which is disposed above the other, means for oscillatably driving said picking devices including a separate elastic yieldable member driving each picking device and adapted to increase the force of the blows imparted by said picking devices and to independently yield upon predetermined picking loads thereon, a shaker conveyor mounted on and extending beneath said main frame beyond the rear end thereof and including a reciprocably driven pan extending along said main frame beneath the top thereof, a swivel pan at the receiving end thereof and movable about a vertical axis, and a loading pan extending from said swivel pan in advance of said main frame and resting on and reciprocably movable along the ground to gather the material picked and broken down by said picking devices, said loading pan being movable laterally with said picking devices about said swivel, and an operative connection between said arm and said loading pan for moving said pan laterally upon lateral movement of said arm, said connection being yieldable, to permit continued lateral movement of said arm after said loading pan has engaged a rib of the working place and including two laterally spaced members depending from said arm, and anti-friction devices mounted in said members for lateral yieldable movement with respect thereto and having engagement with opposite sides of said loading pan.

6. In a coal mining and loading machine, a self-propelled main frame mounted on laterally spaced ground supported traction devices, a turntable mounted on said main frame, a picking element mounted on said turntable for lateral movement therewith and for vertical adjustment with respect thereto and including a support frame and housing mounted for vertical adjustment with respect to said turntable about a transverse axis and having two vertically spaced oppositevly moving oscillating picking devices journaled therein and movable about axes disposed at obtuse angles with respect to each other and positioning said picking devices to engage the coal face at penetrating angles at their opposite ends while traveling in opposite directions, and crank and link means mounted in said frame for oscillatably moving said picking devices and including a separate elastic yieldable link in the drive connection to each picking device and adapted to increase the force of the blows imparted by said picking devices and to independently yield upon predetermined picking loads on said picking devices.

7. In a coal mining and loading machine, a self-propelled main frame mounted on laterally spaced ground supported traction devices, a turntable mounted on said main frame, a picking element mounted on said turntable for lateral movement therewith and for vertical adjustment with respect thereto and including a support frame and housing mounted for vertical adjustment with respect to said turntable about a transverse axis and having two vertically space doppositely moving oscillating picking devices journaled therein and movable about axes disposed at obtuse angles with respect to each other and positioning said picking devices to engage the coal face at penetrating angles at spaced apart points while traveling in opposite directions, and crank and link means mounted in said frame for oscillatably moving said picking devices and including a separate elastic yieldable link in the drive connection to each picking device and adapted to increase the force of the blows imparted by said picking devices and to independently yield upon predetermined picking loads on said picking devices, an overhanging arm mounted on said turntable and projecting a substantial distance in advance of the forward end of said main frame and forming a trunnion support for said support frame and housing, means for moving said frame and housing about the axis of said trunnion support for feeding said picking element vertically and for holding said frame and housing in fixed relation with respect to said arm, and a shaker conveyor mounted on and extending along said main frame and having a loading pan extending in advance of said main frame and slidably movable along the ground at its forward end beneath said picking element for picking up the coal picked and broken down by said picking element, and an operative connection between said arm and said loading pan for moving said loading pan with said arm upon lateral movement of said picking element.

8. In a coal mining and loading machine, a self-propelled main frame mounted on laterally spaced ground supported traction devices, a turntable mounted on said main frame, a picking element mounted on said turntable for lateral movement therewith and for vertical adjustment with respect thereto and including a support frame and housing mounted for vertical adjustment with respect to said turntable about a transverse axis and having two vertically spaced oppositely moving oscillating picking devices journaled therein and movable about axes disposed at obtuse angles with respect to each other and positioning said picking devices to engage the coal face at penetrating angles at spaced apart points while traveling in opposite directions, and crank and link means mounted in said frame and housing for oscillatably moving said picking devices and including a separate elastic yieldable link in the drive connection to each picking device and adapted to increase the force of the blows imparted by said picking devices and to independently yield upon predetermined loads on said picking devices, an overhanging arm mounted on said turntable and projecting a substantial distance in advance of the forward end of said main frame and forming a trunnion support for said frame and housing, means for moving said frame and housing about the axis of said trunnion support for feeding said picking element vertically and for holding said frame and housing in fixed relation with respect to said arm, a shaker conveyor mounted on and extending along said main frame and arm and having a loading pan extending in advance of said main frame and slidably movable along the ground at its forward end beneath said picking element for picking up the coal picked and broken down by said picking element, and an operative connection between said arm and said loading pan for laterally moving said loading pan upon lateral movement of said arm and picking element including two laterally spaced members depending from said arm, an anti-friction member mounted in each of said depending members for lateral yieldable movement with respect thereto and having engagement with opposite sides of said loading pan, for moving said loading pan upon lateral movement of said arm and for permitting continued movement of said arm and picking element when said loading pan comes into engagement with either rib of the working place.

9. An apparatus for picking and breaking down coal from a solid face of a mine wall including a support frame, two oppositely moving oscillating picking devices journaled in said frame for pivotal movement about axes extending at obtuse angles with respect to each other and positioning said picking devices to engage the coal face at penetrating angles while traveling in opposite directions, and a crank and linkage elastic drive means for oscillatably moving said picking devices in opposite directions to engage the coal face with penetrating blows during their forward and return strokes.

10. An apparatus for picking and breaking down coal from a solid face of a mine wall including a support frame, two oppositely moving oscillating picking devices journaled in said frame for pivotal movement about axes extending at obtuse angles with respect to each other and positioning said picking devices to engage the coal face at penetrating angles while traveling in opposite directions, and a crank and linkage elastic drive means for oscillatably moving said picking devices in opposite directions to engage the coal face with penetrating blows during their forward and return strokes, and including a separate yieldable link having operative connection with each of said picking devices and adapted to increase the force of the blows imparted by said picking devices during their forward and return strokes and to yield upon predetermined picking loads thereon.

11. An apparatus for picking and breaking down coal from a solid face of a mine wall including a support frame, two oppositely moving oscillating picking devices journaled in said frame for pivotal movement about axes extending at obtuse angles with respect to each other and positioning said picking devices to engage the coal face at penetrating angles while travelling in opposite directions, and a crank and linkage means for oscillatably moving said picking devices in opposite directions to penetrate the coal during their forward and return strokes including a motor, a crank rotatably driven thereby, a connecting rod, two elastic yieldable links reciprocably driven by said connecting rod and forming elastic drive members for said picking devices, and operative connections between each of said links and respective of said picking devices for oscillating said picking devices in opposite directions, said yieldable links including preloaded springs adapted to increase the force of the blows imparted by said picking devices and to independently yield upon predetermined picking loads on said picking devices.

12. An apparatus for picking and breaking down coal from a solid face of a mine wall including a support frame, two oppositely moving oscillating picking devices journaled in said frame for pivotal movement about axes extending at obtuse angles with respect to each other and positioning said picking devices to engage the coal face at penetrating angles while travelling in opposite directions, and a crank and linkage means for oscillatably moving said picking devices in opposite directions to penetrate the coal during their forward and return strokes including a motor, a crank rotatably driven thereby, a reciprocably movable slide, a connecting rod connecting said crank with said slide for reciprocably moving said slide, two elastic yieldable links pivotally mounted on said slide and reciprocably driven thereby and forming elastic drive members for said picking devices, each of said links including a spring loaded plunger, and separate operative connections between said plungers and respective of said picking devices for reciprocably moving said picking devices in opposite directions, said plungers serving to increase the force of the blows imparted by said picking devices and being yieldable upon predetermined picking loads on said picking devices.

13. An apparatus for picking and breaking down coal from a solid face of a mine wall including a support frame, two oppositely moving oscillating picking devices journaled in said frame for pivotal movement about axes extending at obtuse angles with respect to each other and positioning said picking devices to engage the coal face at penetrating angles while traveling in opposite directions, and a crank and linkage means for oscillatably moving said picking devices in opposite directions to penetrate the coal during their forward and return strokes including a motor, a crank rotatably driven thereby, a reciprocably movable slide, a connecting rod connecting said crank with said slide for reciprocably moving said slide, two elastic yieldable drive links pivotally mounted on said slide and reciprocably driven thereby, each of said links including a spring loaded plunger, and separate operative connections between said plungers and said picking devices, including two coaxial rocking arms, a separate gear segment reciprocably driven by each of said rocking arms, and a separate pinion meshing with each of said gear segments, said pinions having operative connection with said picking devices for reciprocably driving said picking devices upon reciprocable movement of said gear segments.

14. An apparatus for picking and breaking down coal from a solid face of a mine wall including a support frame, two oppositely moving oscillating picking devices journaled in said frame for pivotal movement about axes extending at obtuse angles with respect to each other and positioning said picking devices to engage the coal face at penetrating angles while traveling in opposite directions, and a crank and linkage means for oscillatably moving said picking devices in opposite directions to penetrate the coal during their forward and return strokes including a motor, a crank rotatably driven thereby, a reciprocably movable slide, a rocking member, a link operatively connecting said crank with said rocking member and a pair of spaced links operatively connecting said rocking member with said slide, for reciprocably moving said slide, two laterally spaced elastic yieldable links pivotally mounted on said slide intermediate their ends for movement about vertical axes and including spring loaded plungers operatively connected with respective of said picking devices and providing elastic independently yieldable drives to said picking devices adapted to increase the force of the blows imparted by said picking devices and to independently yield upon predetermined picking loads thereon.

15. An apparatus for picking and breaking down coal from a solid face of a mine wall including a support frame, two oppositely moving oscillating picking devices journaled in said frame for pivotal movement about axes extending at obtuse angles with respect to each other and positioning said picking devices to engage the coal face at penetrating angles while traveling in opposite directions, and a crank and linkage means for oscillatably moving said picking devices in opposite directions to penetrate the coal during their forward and return strokes including a motor, a crank rotatably driven thereby, a reciprocably movable slide, a rocking member, a link operatively connecting said crank with said rocking member and a pair of spaced links operatively connecting said rocking member with said slide, for reciprocably moving said slide, two coaxial rocking arms pivotally mounted in said frame, a gear segment adjacent one side of said frame reciprocably moved by one of said rocking arms and a gear segment adjacent the opposite side of said frame reciprocably moved by the other of said rocking arms, pinions meshing with said gear segments and having operative connection with said picking devices for oscillatably moving said picking devices at variable angular velocities, and elastic operative connections between said rocking arms and said slide including two laterally spaced yieldable links pivotally mounted on said slide intermediate their ends, for movement about vertical axes, and having spring loaded plungers mounted therein and pivotally connected with said rocking arms, said plungers providing elastic independently yieldable drives to said picking devices adapted to increase the force of the blows imparted by said picking devices and to independently yield upon predetermined picking loads thereon.

16. In a mining machine, a main frame, a support mounted on said main frame and adapted to move with respect thereto for supporting dislodging means for picking and breaking down material being mined from a seam, said dislodging means comprising a pair of picking arms mounted on the end of said support remote from said main frame in separate converging planes, means for oscillating said picking arms back and forth past one another proximate to the point of convergence of their said planes, each of said picking arms having at its moving end cutting formations extending in the direction of movement thereof to penetrate the face of said seam during such oscillatory movement.

17. In a mining machine according to claim 16, elastic means associated with said picking arms adapted to absorb predetermined overloads applied to said arms.

18. In a mining machine, a main frame, a support mounted on said main frame and adapted to move with respect thereto for supporting dislodging means for picking and breaking down material being mined from a seam, said dislodging means comprising a pair of picking arms mounted on the end of said support remote from said main frame in separate converging planes, means for oscillating said picking arms back and forth past one another proximate to the point of convergence of their said planes, each of said picking arms having at its remote end cutting bits extending in opposite directions along the line of movement thereof to penetrate the face of said seam during such oscillatory movement.

19. In a mining machine, a main frame, a support mounted on said main frame and adapted to move with respect thereto for supporting dislodging means for picking and breaking down material being mined from a seam, said dislodging means comprising a pair of sector-shaped picking members mounted on the end of said support remote from said main frame in separate converging planes, means for arcuately oscillating the sectors back and forth past one another at a cutting point, each of said sectors having radially extending leading and lagging edge portions carrying oppositely disposed cutting formations extending in the direction of arcuate movement thereof to penetrate the face of said seam during such arcuate oscillatory movement.

20. In a mining machine, a main frame, a support mounted on said main frame and adapted to move with respect thereto for supporting dislodging means for picking and breaking down material being mined from a seam, said dislodging means comprising a pair of picking arms mounted on the end of said support remote from said main frame in separate converging planes, means for arcuately oscillating the sectors back and forth in opposite directions past one another at a cutting point, cutting bits along the leading and lagging edges of each picking arm extending in the direction of arcuate movement thereof for penetrating the face of said seam during such arcuate oscillatory movement in both back and forth directions.

References Cited in the file of this patent or the original patent

UNITED STATES PATENTS

| Number | Name | Date |
|---|---|---|
| 773,882 | Millward | Nov. 1, 1904 |
| 1,880,091 | Hughes | Sept. 27, 1932 |
| 2,269,781 | Osgood | Jan. 13, 1942 |

FOREIGN PATENTS

| Number | Country | Date |
|---|---|---|
| 16,030 | Austria | Apr. 25, 1904 |
| 225,482 | Germany | Sept. 12, 1910 |
| 601,461 | Germany | Aug. 24, 1934 |